(12) United States Patent
Winer (10) Patent No.: US 9,530,120 B2
(45) Date of Patent: Dec. 27, 2016

(54) AUTOMATICALLY UPDATING A DISPLAY OF TEXT BASED ON CONTEXT

(75) Inventor: Morgan Winer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 174 days.

(21) Appl. No.: 13/485,162

(22) Filed: May 31, 2012

(65) Prior Publication Data

US 2013/0325971 A1  Dec. 5, 2013

(51) Int. Cl.
*G06F 15/16* (2006.01)
*G06Q 10/10* (2012.01)

(52) U.S. Cl.
CPC .................. *G06Q 10/1091* (2013.01)

(58) Field of Classification Search
USPC ............. 709/206–207; 705/14.58; 455/414.1
See application file for complete search history.

(56) References Cited

U.S. PATENT DOCUMENTS

| | | | |
|---|---|---|---|
| 2004/0117501 A1 | 6/2004 | Day | |
| 2004/0203664 A1* | 10/2004 | Lei | H04M 3/53 455/414.1 |
| 2005/0060365 A1* | 3/2005 | Robinson et al. | 709/203 |
| 2005/0259802 A1* | 11/2005 | Gray et al. | 379/201.01 |
| 2007/0255831 A1 | 11/2007 | Hayashi | |
| 2009/0117881 A1* | 5/2009 | Deshpande | 455/414.1 |
| 2009/0222360 A1* | 9/2009 | Schmitt | G06Q 10/0875 705/29 |
| 2010/0082629 A1 | 4/2010 | Davis | |
| 2010/0093315 A1* | 4/2010 | Grosch et al. | 455/412.2 |
| 2010/0228590 A1 | 9/2010 | Muller | |
| 2010/0273443 A1* | 10/2010 | Forutanpour et al. | 455/404.1 |
| 2010/0312833 A1 | 12/2010 | Rimmer | |
| 2011/0167340 A1 | 7/2011 | Moore | |
| 2011/0307490 A1* | 12/2011 | Chow | G06F 17/30867 707/741 |
| 2013/0095865 A1* | 4/2013 | Roets | 455/466 |
| 2014/0006163 A1* | 1/2014 | Sengupta et al. | 705/14.58 |

FOREIGN PATENT DOCUMENTS

| | | |
|---|---|---|
| CN | 101754125 A | 6/2010 |
| JP | 2006513466 A | 4/2006 |
| KR | 1020090005346 | 1/2009 |
| WO | 2011085118 | 7/2011 |

OTHER PUBLICATIONS

Extended European Search Report received in EP Application No. 13169834.2, dated Sep. 11, 2013.

* cited by examiner

*Primary Examiner* — Abdullahi E Salad
(74) *Attorney, Agent, or Firm* — Blank Rome LLP (57) ABSTRACT

A context-aware message may be displayed differently based on the context in which it is displayed. A message composed on a first device may be determined to include context-based portions that may be modified based on the context of a device that displays the message. The message may be supplemented with context-dependent data that is associated with a context-based portion of the message. The context-dependent data may include a context-neutral representation of the context-based portion as well as instructions on how to convert the context-neutral representation according to the context in which the message is displayed. The original message and the context-dependent data may be transmitted as a context-aware message.

23 Claims, 8 Drawing Sheets

AUTOMATICALLY UPDATING A DISPLAY OF TEXT BASED ON CONTEXT

BACKGROUND

This disclosure relates generally to displaying data on a contextually aware device. More particularly, but not by way of limitation, this disclosure relates to a technique for creating a message that may be modified based on the context in which the message is displayed.

It is becoming more and more common for individuals to communicate using messages transferred between devices electronically. Such messages include electronic mail messages, short messaging service (SMS) text messages, instant messaging application messages, and messages communicated via social network applications. These types of messages almost always include textual data. For the most part, textual data is presented to a recipient of such a message exactly as it is composed by a sender of the message. While this arrangement properly defers to the creator of the content, it fails to take advantage of the "smart" nature of a device that displays the content.

Many of the devices utilized to send and receive the above-described messages have some degree of contextual awareness. That is, the devices are aware of the context (e.g., the location and timing) in which messages are to be displayed. For example, personal digital assistants (PDAs), smart phones, and tablets, notebook and desktop personal computer systems, and other similar devices are often aware of or are able to obtain information regarding their location, preferences based on such location, and/or events that may have transpired between the sending of a message and the display of the message. It is therefore desirable to take advantage of this contextual awareness in order to more efficiently display messages.

SUMMARY

In one embodiment, the invention provides a method to generate a message that can be altered based on the context in which the message is displayed. The method includes identifying a context-based portion of a message that is composed on a device, associating context-dependent data that includes instructions to alter the context-based portion of the message with the identified context-based portion of the message, and transmitting the message and the context-dependent data. In one embodiment, the context-dependent data may include a context-neutral representation of the context-based portion of the message. The method may be embodied in program code and stored on a non-transitory storage medium. The stored program code may be executed by a processor that is part of, or controls, a device used to compose the message.

In another embodiment, the invention provides a method to alter a portion of a received message based on a context of a device on which the message may be displayed. Data indicative of a context-based portion of a message may be identified within a message received by a device. An altered version of the context-based portion of the message may be generated based, at least in part, on the data and the context of the device, and the message may be displayed by the device with the altered version of the context-based portion of the message. In one embodiment, the data may include a context-neutral representation of the context-based portion of the message. The method may be embodied in program code and stored on a non-transitory storage medium. The stored program code may be executed by a processor that is part of, or controls, a device used to display the message.

DETAILED DESCRIPTION

This disclosure pertains to adapting the display of a message based on the context in which the message is to be displayed. In general, techniques are disclosed for identifying a context-based portion of a message, adding context-dependent data to the content of the message, and transmitting the message such that it may be displayed in a contextually aware manner.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the design of systems having the benefit of this disclosure.

Figure 1:
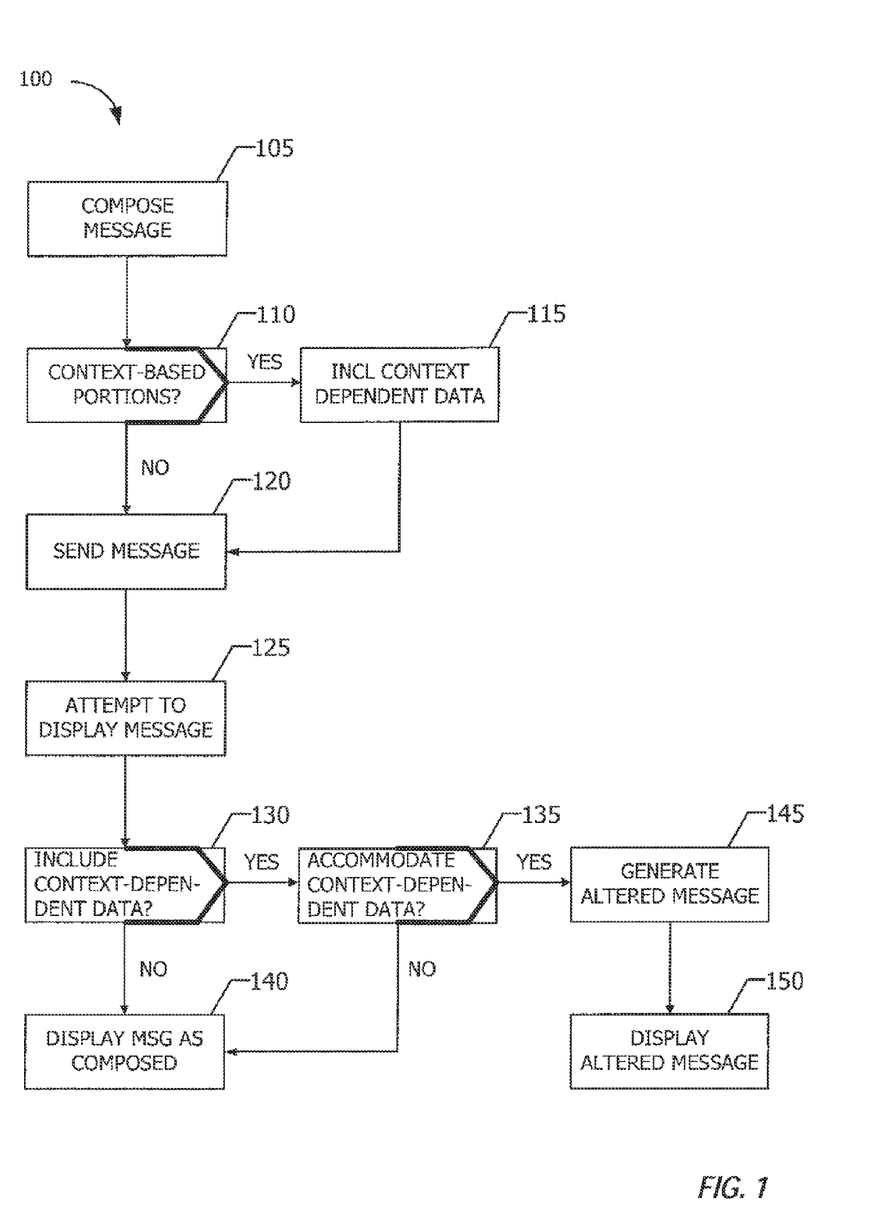
FIG. 1 is a flowchart that depicts, in accordance with one embodiment, an automatic text updating process by which one or more portions of a message may be identified as being context-based and may be altered based on a context in which the message is displayed.

Referring to FIG. 1, automatic text updating process 100 begins with the composition of a message on a first device by a user of the first device (block 105). The message may be an electronic mail message, an SMS message, an instant messaging application message, a message communicated via a social network application (e.g., a status update, comment, or social network message), or any other message including textual data that could be composed by a user of the first device. Further, the message may have attached to it other types of content such as, for example, a digital image or video file. The first device may be a personal digital assistant (PDA), personal music player, mobile telephone, notebook, laptop, tablet computer, desktop computer, server computer, or any other electronic device capable of allowing a user to compose and send a message that includes textual data.

It is then determined whether the message includes any context-based portions (block 110). As used herein, context-based portions of a message include any portions of a message for which it may be desired to display the portion differently based on the context in which the message is displayed. The context in which the message is displayed may include the location of a device displaying the message, preferences of a user of the device displaying the message, the timing of the display of the message by the device, etc. Accordingly, context-based portions of a message may include any portions of the message that may be affected by changes in these parameters. In one embodiment, a context-based portion may include textual data. Several examples of messages including context-based portions will be described in detail below.

In one embodiment, the first device may automatically identify a context-based portion of a message. For example, as described in greater detail below, a telephone number may be formatted differently in different locations (e.g., between the United States and in Europe). Therefore, it may be desirable to display a message including a telephone number differently based on the location of the device displaying the message. Consequently, the first device may identify a series of numbers within a composed message as having the correct number of digits and/or formatting such that the numeric sequence can be automatically identified as a context-based portion of the message. In one embodiment, when a portion of a message is automatically identified as a context-based portion, the user may be asked to confirm that the portion should be identified as a context-based portion. For example, a popup display may appear on the first device asking the user to confirm that a highlighted portion of a message has been properly identified as a context-based portion. In another embodiment, a user composing the message may manually identify a context-based portion of a message. For example, as a user types a message they may highlight a portion of the message and select an option to identify the highlighted portion as context-based.

If one or more portions of the message are identified as being context-based (the "Yes" prong of block 110), context-dependent data may be included with the message (block 115). In one embodiment, the context-dependent data may be associated with the context-based portion of the message and may provide a context-neutral representation of the context-based portion. For example, if the first device is located in California and is used to generate a message saying "The game comes on tonight at 8 pm," the time portion of the message, "8 pm" may be identified as a context-based portion of the message and the context-dependent data may be used to represent that portion in a context-neutral manner, e.g., as "04:00 GMT." In one embodiment, the context-dependent data may be embedded in the textual data. In another embodiment, the message may include both the text as entered by the composer ("8 pm") as well as the context-dependent data ("04:00 GMT") as will be described in greater detail below. As will be understood, generating context-dependent data may include identifying a context of the device on which the message was composed (e.g., composed on a device in California).

If no portions of the message are identified as being context-based (the "No" prong of block 110), or if context-dependent data has been included for each of the identified context-based portions, the message may be sent to its target destination(s) (block 120). In one embodiment, the message (and any context-dependent data) may be transmitted in a markup language. In one embodiment, the message may be sent directly to one or more recipient devices. In a typical embodiment, the message may be communicated via a network connection between the sending device and the one or more recipient devices. In such an embodiment, the network connection may take any form including, but not limited to, a local area network (LAN), a wide area network (WAN) such as the Internet or a combination of local and wide-area networks. Moreover, the network ray use any desired technology, or combination of technologies (wired, wireless or a combination thereof) and protocol (e.g., transmission control protocol, TCP). In another embodiment, the message may be sent to a recipient indirectly. For example, the user of the first device may generate a social network message that can be retrieved through a social network application by any person in a social network relationship with the user.

The recipient device may then attempt to display the message (block 125). In one embodiment, the recipient's device may indicate that they have received a new message and the user may browse to an interface through which the message may be displayed. In response to the attempt to display the message, it may be determined whether the message includes any context-dependent data (block 130). Stated differently, it may be determined whether the message includes any context-based portions. In one embodiment, the presence of context-dependent data may be identifiable by the recipient device from the content of the message. For example, if the message is communicated in a markup language, the context-dependent data may be identifiable based on a particular markup instruction (e.g., tag) associated with context-dependent data. In another embodiment, the context-dependent data may be appended to the originally composed data and may be identifiable by the recipient device based on the presence of a uniquely identified section of appended data.

If it is determined that the message includes context-dependent data (the "Yes" prong of block 130), it may be determined whether the recipient device can accommodate the context-dependent data. In one embodiment, it may be determined that the device can accommodate the context-dependent data if the device includes the software necessary to after the message based on the context-dependent data. In another embodiment, it may be determined that the device can accommodate the context-dependent data if the device includes an interpreter for the markup language in which the context-dependent data is communicated. If the recipient device is unable to utilize the context-dependent data to render the message in a context-aware manner, it may be determined that the recipient device cannot accommodate the context-dependent data.

If it is determined that either the message does not include any context-dependent data (the "No" prong of block 130), or that the device cannot accommodate the context-dependent data (the "No" prong of block 135), the message may be displayed on the recipient device as composed by the sender in a manner consistent with the message type (e.g., SMS message versus email message) (block 140). Because the message may include the original message composed by the sender, if the recipient device is incapable of utilizing the context-dependent data (or if none exists), the original message may be displayed. Accordingly, in a situation in which a recipient device is incapable of converting context-based portions of a received message, the display of the message may default to the content created by the sender. Moreover, because a message may be sent to multiple devices, the inclusion of the original message in addition to the context-dependent data may eliminate compatibility issues by allowing those recipient devices that are capable of utilizing the context-dependent data to display the message in a context-aware manner while other recipient devices may still be able to view the message as created by the sender.

If the message includes context-dependent data (the "Yes" prong of block 130) and if the device is capable of accommodating the context-dependent data (the "Yes" prong of block 135), the message may be altered so that it may be displayed in a context-aware manner (block 145). In one embodiment, the message may be altered by performing instructions identified by the context-dependent data and substituting the results of such instructions for the appropriate context-based portions of the message.

In one embodiment, the context-dependent data may provide a context-neutral representation of a context-based portion of the message and may identify an operation to be performed by the recipient device in order to adapt the context-neutral representation to the context of the device displaying the message. In one embodiment, such an operation may cause the recipient device to identify its location and to determine properties based on the location. These properties may be derived from a local data store on the recipient device that correlates location information with location-based properties as described in greater detail below. By way of example, a device receiving the "The game comes on tonight at 8 pm" message described above may receive the original message as well as the context-dependent data that identifies the context-neutral time as "04:00 GMT," The recipient device may then identify its location as Miami, Fla. In one embodiment, location identification may be based on global positioning satellite (GPS) location information known by the device. In another embodiment, location identification may be based on triangulation methods. The location information may then be used to determine location-based properties of the device. For example, the location may be used to determine that the device is in the Eastern US time zone and that the Eastern US time zone has a Greenwich Mean Time (GMT) offset of −5 hours. Therefore, the context-neutral "04:00 GMT" may be adapted to "11 pm" which may replace the "8 pm" context-based portion of the original message. Accordingly, the message may be displayed on the recipient device as "The game comes on tonight at 11 pm." It should be noted that the formatting used by the message composer may be retained whenever possible. For example, "8 pm" may be replaced with "11 pm" rather than "11:00," "11:00 pm," or "23:00." This formatting may be identified in the context-dependent data included with the message. In one embodiment, a time-based change may also correspond to a date change. Therefore, the context-based portion of the above described message may be not only "8 pm" but instead "tonight at 8 pm," which may be modified, when appropriate, to "tomorrow at . . . . ."

Although the properties needed to convert some context-based portions of a received message may be obtained by a local operation of the recipient device (e.g., a table lookup for a time zone based on a particular location), other context-based portions may require a recipient device to obtain information from a remote source. For example, a context-based portion may identify directions to a particular location. Obviously, a recipient device will not likely store the directions to the location locally and may therefore acquire directions from a remote source. In one embodiment, the remote source may be a web service. In another embodiment, the remote source to be utilized by the recipient device may be identified in the context-dependent data. After each of the context-based portions of the message has been altered, the altered message may be displayed on the recipient device (block 150).

Figure 2:
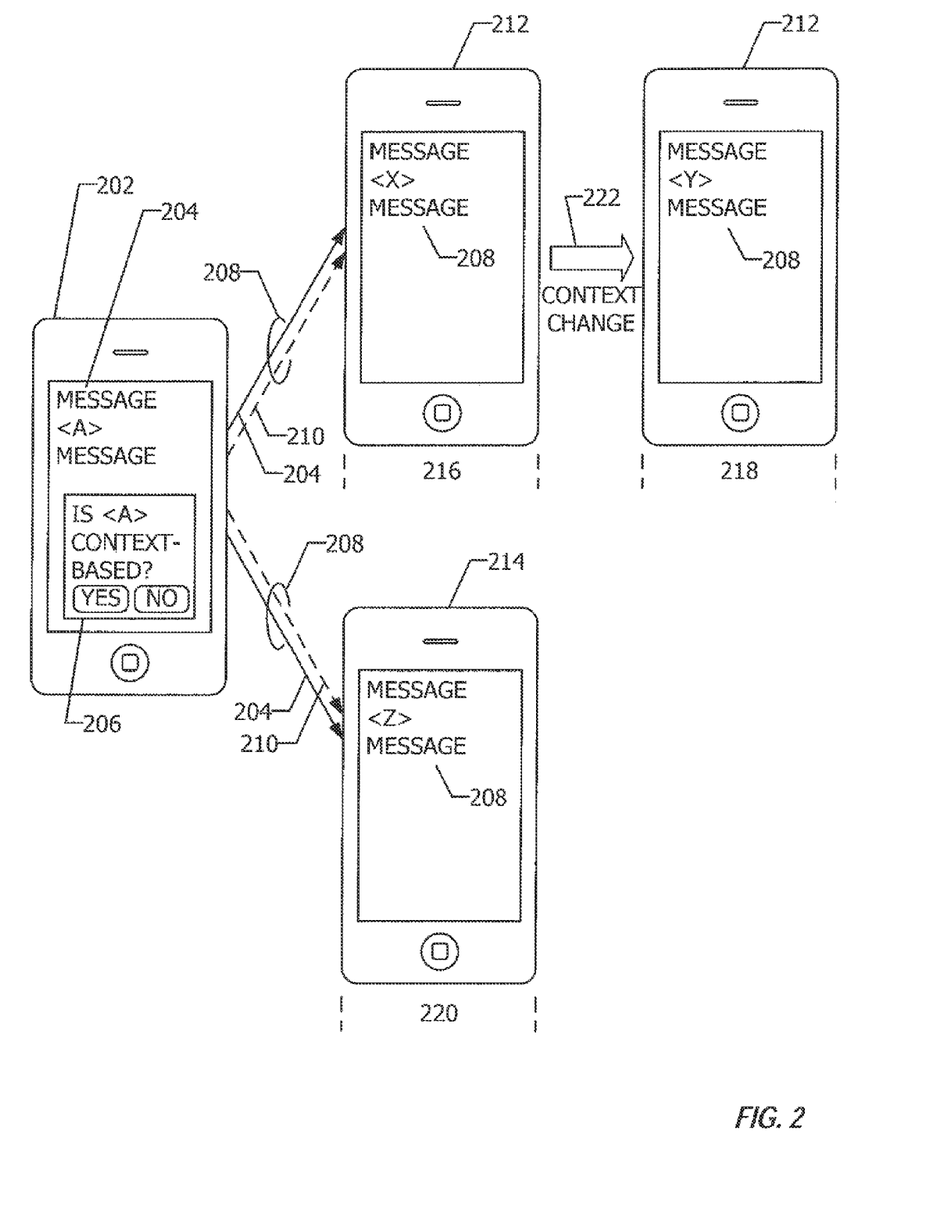
FIG. 2 is a block diagram that illustrates the transmission of a message from a sending device to multiple receiving devices and the unique display of the message at the receiving devices based on the context of the receiving devices displaying the message according to one embodiment.

Referring to FIG. 2, a block diagram illustrates the display of text generated by a first device in a contextually-aware manner by one or more recipient devices. A user generates message 204 on device 202. As described above, the message may be any type of message such as an electronic mail message, an SMS message, an instant messaging application message, a social network message, etc. In the illustrated embodiment, it is determined that a portion of message 204 may be context-based. In one embodiment, popup 206 may be displayed on device 202 prompting the user to confirm whether the portion (denoted as <A>) should be identified as context-based. In one embodiment, popup 206 may be displayed automatically as the user composes message 204 when a portion of message 204 is determined to correspond to text that may be context-based. In another embodiment, a single interface that identifies all of the automatically recognized context-based portions may be displayed after the user composes message 204 (rather than as the user composes message 204). Popup 206 may allow a user to avoid the unintentional automatic identification of a portion of message 204 as context-based. While it may often be desirable for a certain type of content (e.g., time) to be identified as context-based, such identification may not always be appropriate. For example, while it may be desirable for a message composed in New York and sent to a friend on vacation in Hawaii stating that "The game comes on at 8 pm" to be displayed as "The game comes on at 2 pm," it may not be desirable for a message stating that "The neighbor's dog woke me up at 3 AM" to be displayed as "The neighbor's dog woke me up at 9 PM." Nonetheless, in another embodiment, a portion of message 204 may be automatically identified as context-based without prompting the user to confirm that the portion should be identified as such.

The user may also be able to manually identify a portion of message 204 as context-based. In such an embodiment, a text entry interface may also include an option to select a portion of message 204 that should be treated as context-based. As described above, if one or more portions of message 204 are identified as context-based, context-dependent data may be added to the content of message 204 in order to allow the message to be displayed on a recipient device in a contextually aware manner. As further described above, the context-dependent data may include a context-neutral representation of a context-based portion of message 204 as well as, perhaps, instructions for converting the context-neutral representation based on the context of the recipient device. Context-aware message 208 may therefore include the original content of message 204 (i.e., the content of message 204 as composed by the user of device 202) as well as context-dependent data 210. Although the original content of message 204 and context-dependent data 210 are illustrated separately for purposes of clarity, it will be understood that context-aware message 208 may typically be transmitted as a single message and that context-dependent data 210 may be integrated with the original content of message 204.

Context-aware message 208 is received by devices 212 and 214. In one embodiment, context-aware message 208 may be directly transmitted to devices 212 and 214. For example, context-aware message 208 may be transmitted over a network connection between device 202 and each of the recipient devices. In another embodiment, context-aware message 208 may be indirectly transmitted to one or more of devices 212 and 214. For example, context-aware message 208 may be communicated as an email or social network message that is retrieved from a server computer system by client devices 212 and 214. As illustrated, context-aware message 208 may be displayed on device 212 in a first context 216. Context 216 may be based on the timing of the display of message 208, the location of device 212 when displaying message 208, etc. Based on context 216, the context-based portion "<A>" of original message 204 may be replaced with "<X>" in displayed message 208. In a similar manner, message 208 may be displayed on device 214 in a context 220. Based on context 220, the context-based portion "<A>" of original message 204 may be replaced with "<Z>" in displayed message 208.

FIG. 2 also illustrates that message 208 maintains its contextual awareness even after it is displayed for a first time. As illustrated, device 212 may undergo a change in context. In one embodiment, context change 222 may be based on the passage of time. In another embodiment, context change 222 may be based on a change in location of device 212. When message 208 is displayed on device 212 after context change 222 to context 218, message 208 may be displayed in a different manner than in context 216. Based on context 218, the context-based portion "<A>" of original message 204 may be replaced with "<Y>" rather than "<X>" in displayed message 208. As an example, a business traveler may receive a message that is displayed as "the teleconference is at 6:00 pm tonight" while the traveler is located in California (e.g., context 216). After receiving and viewing the message, the traveler may return home to Texas (e.g., context 218). In an attempt to remember the start time for the teleconference, the business traveler may display message 208 again. Based on the change in context, message 208 may be displayed as "the teleconference is at 8:00 tonight" Therefore, context-aware message 208 may be displayed differently at different times based on a change in context of device 212. It should also be noted that context-aware message 208 may be stored on device 202. Therefore, a sending device may also benefit from the context-aware properties of message 208 in that a subsequent display of the message (e.g., through a sent messages interface) may show the message based on the context in which it is displayed.

Figure 3:
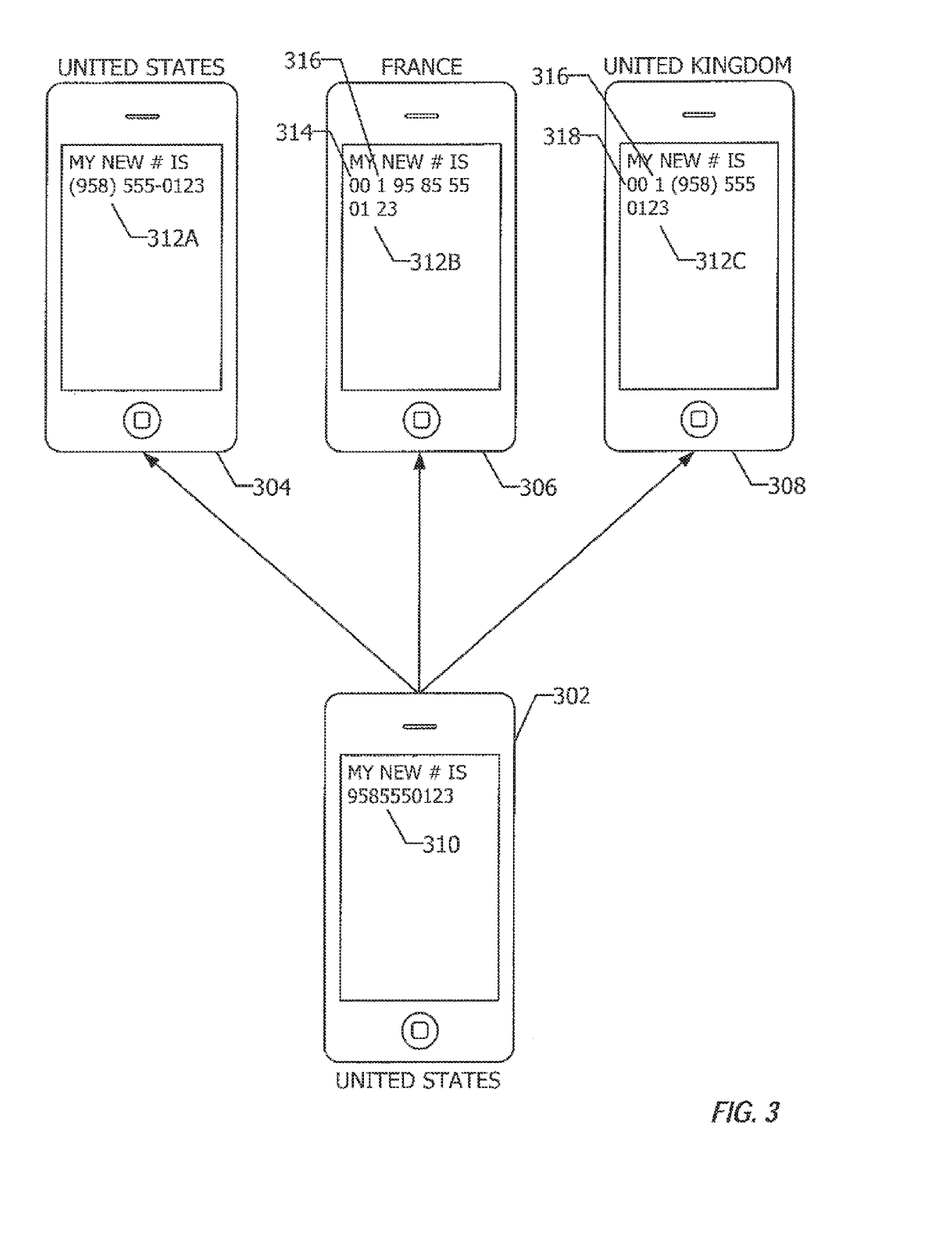
FIG. 3 illustrates an example context-aware message in which the formatting of a context-based telephone number is modified based on the context of the display of the message according to one embodiment.

In an example embodiment illustrated in FIG. 3, context-aware message 312, indicating a new telephone number for a user of device 302, is received by friends of the user located in the United States (device 304), France (device 306), and the United Kingdom (device 308). Original message 310, composed by the user of device 302, may include the telephone number as a consecutive string of digits with no formatting. In one embodiment, device 302 may recognize the number of numeric digits in message 310 (e.g., 10) as corresponding to the number of digits in a typical telephone number in device 302's location and may identify the string of digits as potentially representing a context-based portion of message 310. In such an embodiment, the user of device 302 may be prompted to confirm that the string of digits is a telephone number and should be treated as a context-based portion of message 310. In another embodiment, the user of device 302 may manually identify the string of digits as a context-based portion of message 310. Regardless of the manner in which the phone number is identified as a context-based portion of message 310, message 310 may be altered to include context-dependent data and may be received as context-aware message 312 by each of the three friends. In one embodiment, the context-dependent data may include an identification of the string of digits as a United States telephone number and instructions for converting the display of the context-based telephone number. In one embodiment, context-aware message 312 may include a markup language annotation of the content of message 310,.

Based on the context of device 304, the string of digits "9585550123" may be displayed as "(958) 555-0123" in message 312A in accordance with a standard format for displaying telephone numbers in the United States. In one embodiment, the context of device 304 may be determined based on the location of device 304 at the time the message is displayed. In such an embodiment, the location may be determined based on GPS location information known by the device. In another embodiment, the context of device 304 may be determined based on the typical location of device 304. In such an embodiment, device 304 may use historical location information to determine the context of device 304. For example, if a user of device 304 is a United States resident that is on vacation in Australia, they will likely wish to see the telephone number displayed in the United States format that they are accustomed to rather than an Australian format based on their current location. In still another embodiment, the context of device 304 may be determined based on device settings. In such an embodiment, the context may be determined from preference settings that have been set on device 304 rather than from the current location or historical location information for device 304,.

Based on the context of device 306, the telephone number may be altered to include exit code 314 for making international calls from France, country code 316 for making international calls to the United States, and the string of digits formatted according to a typical format for displaying telephone numbers in France. Accordingly, the string of digits "9585550123" may be displayed as "00 1 95 85 55 01 23" in message 312B. As such, the context-based telephone number may be modified based on the digits that would need to be dialed to call the telephone number and displayed in a manner that is more familiar to the user of device 306. In one embodiment, the conversion of the context-based portion of message 312 may be performed based on preferences in a memory of device 306. For example, device 306 may include a data store that correlates location information with location-based properties such as the inclusion of exit code 314 and country code 316 for dialing an international telephone number as well as the formatting of a telephone number. Therefore, the context-dependent data of message 312 may include instructions to cause device 306 to reference the location-based properties and to display the context-based portion in accordance with those properties.

In a similar manner, based on the context of device 308, the telephone number may be altered to include exit code 318 for making international calls from the United Kingdom, country code 316 for making international calls to the United States, and the string of digits formatted according to a typical format for displaying telephone numbers in the United Kingdom. Accordingly, the string of digits "9585550123" may be displayed as "00 1 (958) 555 0123" In message 312C. Therefore, context-aware message 312 may provide the necessary information to allow a recipient device to convert the formatting of a context-based portion of a message according to the context of a recipient device.

Figure 4:
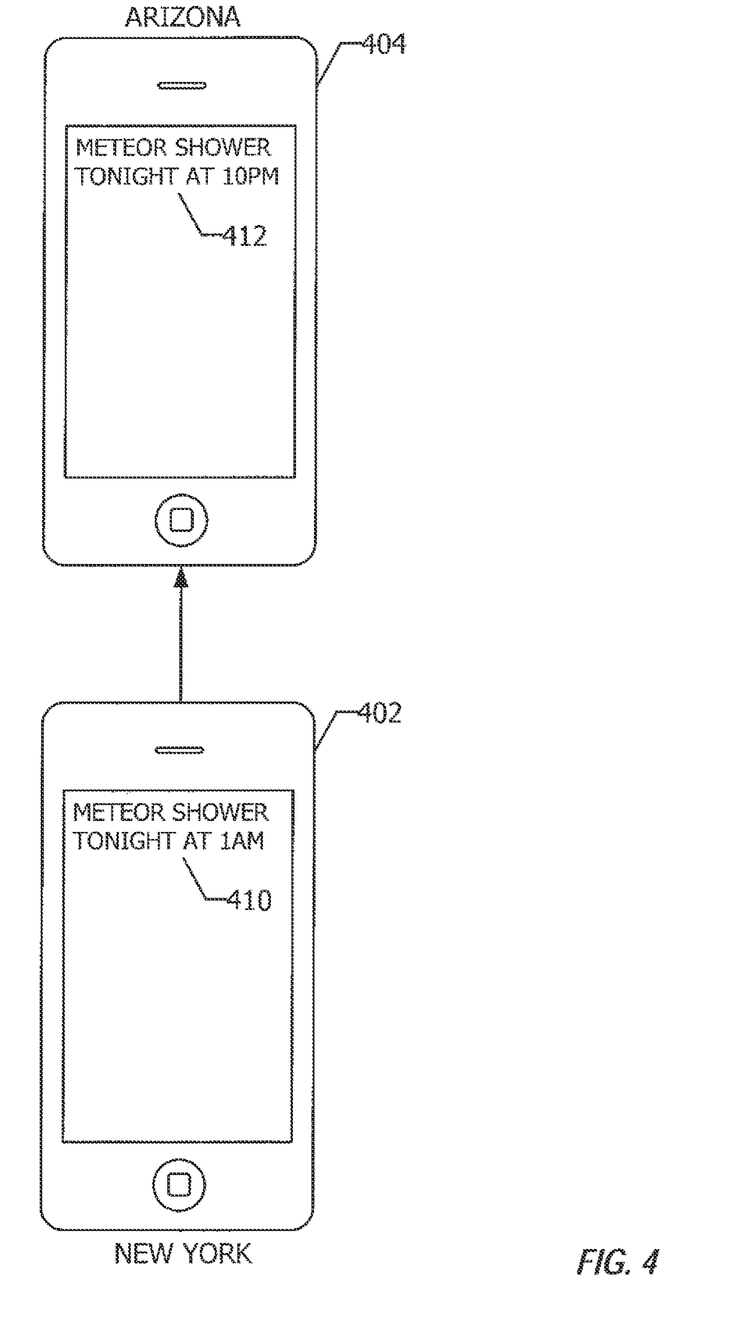
FIG. 4 illustrates an example context-aware message in which a context-based time is modified based on the context of the device on which the message is displayed according to one embodiment.

In another example embodiment illustrated in FIG. 4, a context-aware message 412, indicating the time of a meteor shower, is sent from device 402 located in New York to device 404 located in Arizona. A user of device 402 composes message 410 indicating the occurrence of the meteor shower at 1 AM local time. The local time in message 410 may be identified as a context-based portion of message 410. As described above, identification of the local time as a context-based portion of message 410 may occur automatically or manually. Based on the identification of the local time as a context-based portion of message 410, context-dependent data may be added to the content of message 410. In one embodiment, the addition of context-dependent data may first include expressing the local time in a context-neutral manner. As such, the context of device 402 as well as the context of the time referred to in message 410 may be determined. Based on the determination that device 402 is located in New York, it may subsequently be determined (e.g., by consulting location-based properties stored on device 402) that the location of device 402 corresponds to the United States Eastern Time Zone. It may also be determined that the location observes Daylight Saving Time and that the context-based portion of message 410 refers to a time during which daylight saving time is active. Accordingly, it may be determined that the context-based portion of message 410 refers to a time entered in Eastern Daylight Time (EDT) format. It can then be determined that the EDT format corresponds to a Greenwich Mean Time (GMT) offset of −4 hours and that the entered text "1 AM" of message 410 may be expressed in a context-neutral format of "5 AM GMT."

The context-dependent data added to message 410 may identify the context-neutral representation of the context-based time of message 410 as well as instructions to convert the context-neutral representation based on the context in which the message is displayed. Message 412, which includes the context-dependent data, may be received at device 404. In response to an attempt to display message 412 on device 404, the context-dependent data may be utilized to present message 412 according to the context of device 404. Accordingly, it may be determined that device 404 is located in Arizona, that the corresponding time zone is United States Mountain Time, and that the location does not observe daylight saving time. It may therefore be determined that device 404 is in a location with a GMT offset of −7 hours. The context-neutral representation (i.e., 5 AM GMT) of the originally entered context-based time (i.e., 1 AM) may therefore be converted based on the context of device 404 and displayed as "10 PM." Therefore, rather than attempting to identify the time zone referred to in message 410 and converting that time based on location, a user of device 404 may simply trust that the time is displayed according to the location of device 404. Moreover, although message 412 is only illustrated as being communicated to a single device, the message could just as easily have been sent to multiple devices in multiple different time zones. Therefore, by identifying the time in message 410 as context-based, the user of device 402 may avoid sending multiple customized messages to recipients based on theft location or attempting to explain the timing of the meteor shower in a single message to the multiple recipients. As such, the contextual awareness of message 412 may simplify the acts of composing a message and interpreting a received message,.

Figure 5:
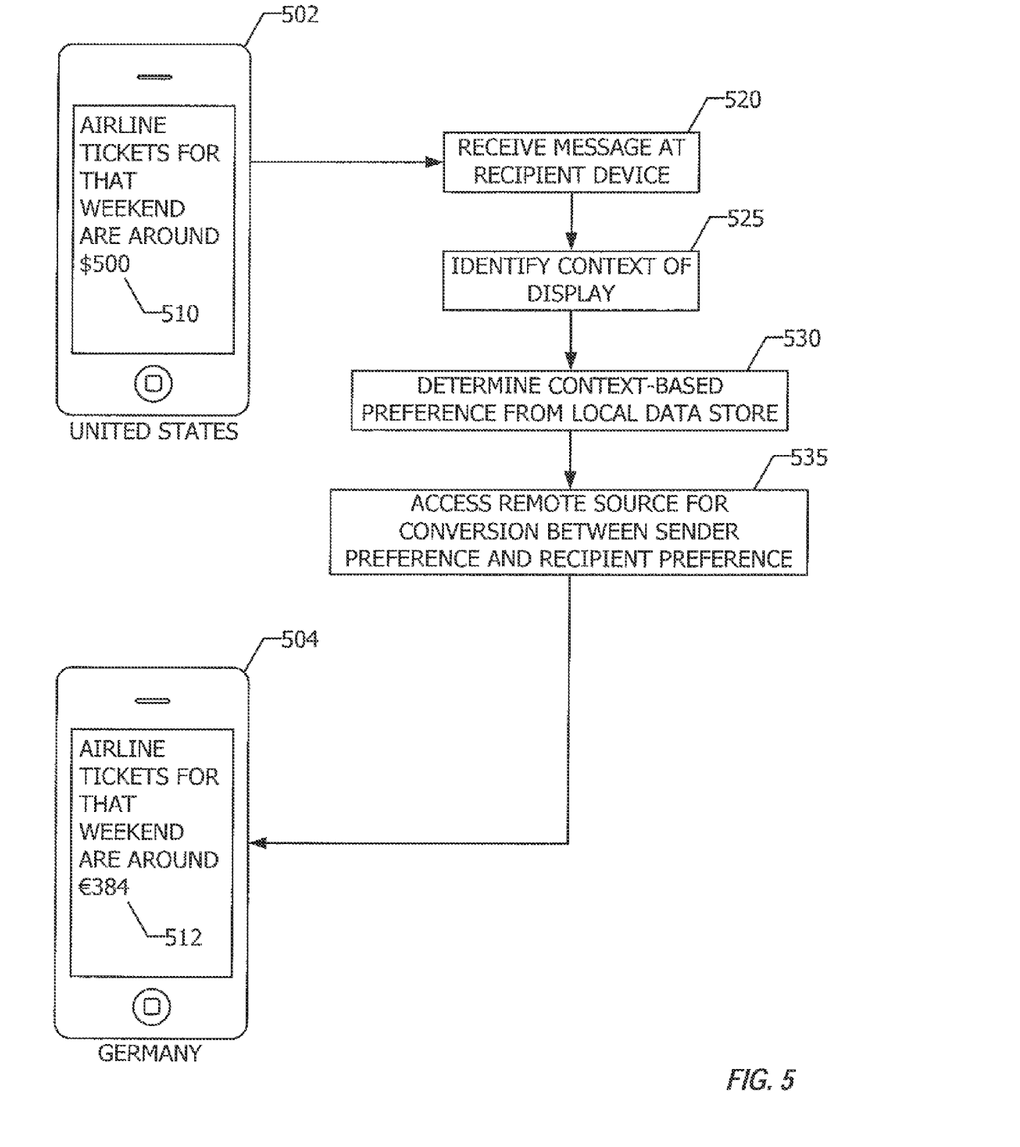
FIG. 5 illustrates a process to display a context-aware message that includes instructions to obtain information from a remote source according to one embodiment.

Referring to FIG. 5, a process of displaying a context-aware message includes instructions to obtain information from a remote source. Until this point, the example context-aware messages have primarily involved the modification of text based on information corresponding to the context of a recipient device that may be obtained from locally-stored properties. For example, a phone number format conversion or a time zone conversion may be based on location-based properties stored on a recipient device. However, other types of conversions may require access to information that cannot be practically stored on the device. Therefore, in the embodiment illustrated in FIG. 5, the context-dependent data may include instructions to convert a context-based portion of a message based, at least in part, on information obtained from a remote source.

The user of device 502 may compose message 510 that includes a price expressed in terms of a particular currency. In the illustrated embodiment, message 510 expresses an approximate price of "$500" for airline tickets. When the value and currency are identified as a context-based portion of message 510, it may be determined based on the context of device 502 that the value is expressed in United States dollars (USD) (e.g., as opposed to Australian or Canadian dollars). In one embodiment, this may be determined automatically based on the context of device 502 (e.g., the location of device 502 in the United States) and the inclusion of the "$" symbol in the context-based portion. In another embodiment, the user of device 502 may be asked to confirm the currency for the context-based price. Based on the currency of the context-based price in message 510, context-dependent data may be added to the content of message 510 and context-aware message 512 may be sent by device 502. Message 512 may then be received by device 504 (block 520). In response to an attempt to display message 512 by device 504, the context of the display of message 512 may be identified (block 525). In the illustrated embodiment, the identification of the context of the display of message 512 may include the determination of the location of device 504 and the timing of the display of message 512. As described above, the location of device 504 may be determined based on the location of device 504 at the time of the attempt to display message 512, the typical location of device 504 based on historical location information, location preferences entered by a user of device 504, etc. The context of device 504 may then be utilized to determine context-based preferences of device 504 from a local data store (block 530). In the illustrated embodiment, the location of device 504 in Germany may be utilized to determine that a value should be expressed in terms of euros (EUR).

Having determined the appropriate context-based preference for currency, the context-dependent data may include additional instructions to convert between the sender preference (USD) and the recipient preference (EUR) by accessing a remote source (block 535). In one embodiment, the remote source may be a web application hosted on a web server. Therefore, device 504 may obtain the desired information from the remote source via an Internet connection. In one embodiment, the context-dependent data may identify the specific remote source to be utilized by the recipient device. In another embodiment, the context-dependent data may identify the type of information to be provided by the remote source (e.g., currency conversion rate) and may allow the recipient device to select the specific remote source. Utilizing the currency preference obtained from the local data store and the currency conversion rate for USD to EUR obtained from the remote source, the "$500" price from message 510 may be displayed as "€ 384" on device 504. In one embodiment, if any part of the conversion of the context-based portion cannot be completed (e.g., the recipient device cannot access the remote source), the message may be displayed as it was composed,.

Figure 6:
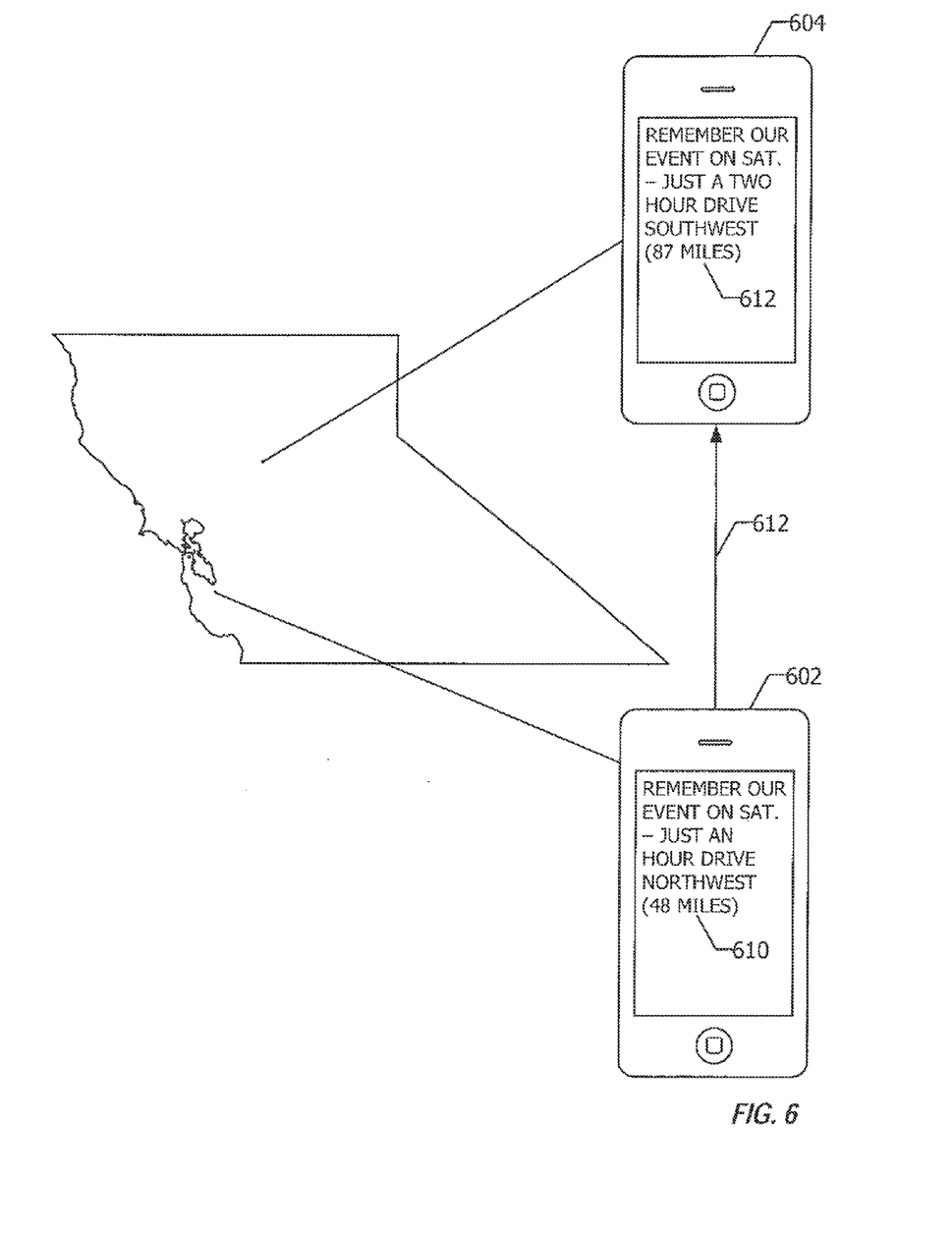
FIG. 6 illustrates an example context-aware message in which a context-based drive time and distance may be modified based on the context of the device on which the message is displayed according to one embodiment.

In another example of a context-aware message that relies on information that may be retrieved from a remote source, FIG. 6 illustrates a message 610 with a reminder for an upcoming event along with an approximate drive time and distance (expressed in terms of the location of device 602 in San Jose, Calif.) to the event. The drive time and distance portion of message 610 may be identified as a context-based portion. As described above, the content of message 610 may therefore be supplemented with context-dependent data and transmitted as context-aware message 612. In one embodiment, the context-dependent data may provide a context-neutral representation of the drive time and distance expressed simply as the destination location. For example, the user of device 602 may be prompted to identify the destination location referenced by the user's inclusion of the drive time and distance in message 610. In one embodiment, in response to the determination that the context-based drive time and distance should be expressed as a context-neutral destination location, device 602 may display a map that prompts the user to identify the destination location. In one embodiment, the map may be zoomed to and centered on an approximate location identified by the text entered by the user. For example, device 602 may interpret the user's text as referring to a particular destination location and may allow the user to select a more precise destination. In the illustrated embodiment, it may be determined that the destination location for the event referenced in message 610 refers to a location in San Francisco, Calif. Therefore, the context-dependent data may represent the drive time instructions in a context-neutral manner as the coordinates of the destination location.

The context-dependent data may additionally include instructions to allow a device that attempts to display message 612 to convert the context-neutral destination location to drive time and distance information based on the location of the device. As described above with respect to FIG. 5, device 604 may access a remote source to determine the drive time and distance information. In one embodiment, the context-dependent data may instruct device 604 to provide a current location (e.g., Sacramento) as a start point and the context-neutral destination (e.g., San Francisco) as an end point to a web-based mapping application. In such an embodiment, the mapping application may retrieve driving directions and current traffic conditions between the start point and the end point and return a drive time and distance to device 604. Device 604 may then utilize the obtained information to display message 612 based on the context of device 604.

Additional examples of the modification of textual data based on information retrieved from a remote source will be understood by those of ordinary skill in the art having the benefit of this disclosure. In one example, a message pertaining to television programming may be customized based on a context of a recipient device. While a message indicating a broadcast time for a favorite television show may be modified based on a recipient's time zone, television shows may be broadcast at different times in different time zones. For example, a prime time television drama may be aired at 9 PM in the Eastern time zone and tape delayed for re-broadcast at 9 PM in the Pacific time zone (rather than at 6 PM). Therefore, a straight time zone conversion may not convey the information properly. However, if a time portion of a message describing a television show is tied to a remote source (e.g., a web-based television programming application), the appropriate timing as well as additional information (e.g., episode summary) may be retrieved and displayed in the message. Moreover, if information regarding a television service provider for a user of a recipient device has been entered as a setting on the recipient device, the message may be modified to reflect appropriate channel information, etc,.

In yet another example of the modification of textual data based on information retrieved from a remote source, a reference to a resource may be modified to incorporate the resource itself. For example, it is common for a message to identify information that can be obtained from a certain Internet location. Such a message may include a uniform resource locator (URL) to a news article, blog posting, etc. Oftentimes, the message may include a selectable hyperlink that causes a browser to open and to display the resource indicated by the URL. While the reference may allow a recipient to arrive at the appropriate location, the content may be incorporated directly into the message rather than viewed through a separate browser interface in accordance with an embodiment of the disclosure. For example, if a user generates a message that includes a link to a news article, the link itself may be utilized to access a remote source to modify the message. In such an embodiment, the message displayed on the recipient device may include the text from the resource (i.e., the text of the news article) rather than a link to the resource. In one embodiment, any extraneous portions of the resource (e.g., banners, advertisements, etc.) may be removed such that only the text of the identified article may be displayed in the message. While multiple examples of the modification of textual data based on information obtained from a remote source have been provided, numerous additional examples will be apparent to those of ordinary skill in the art.

Figure 7:
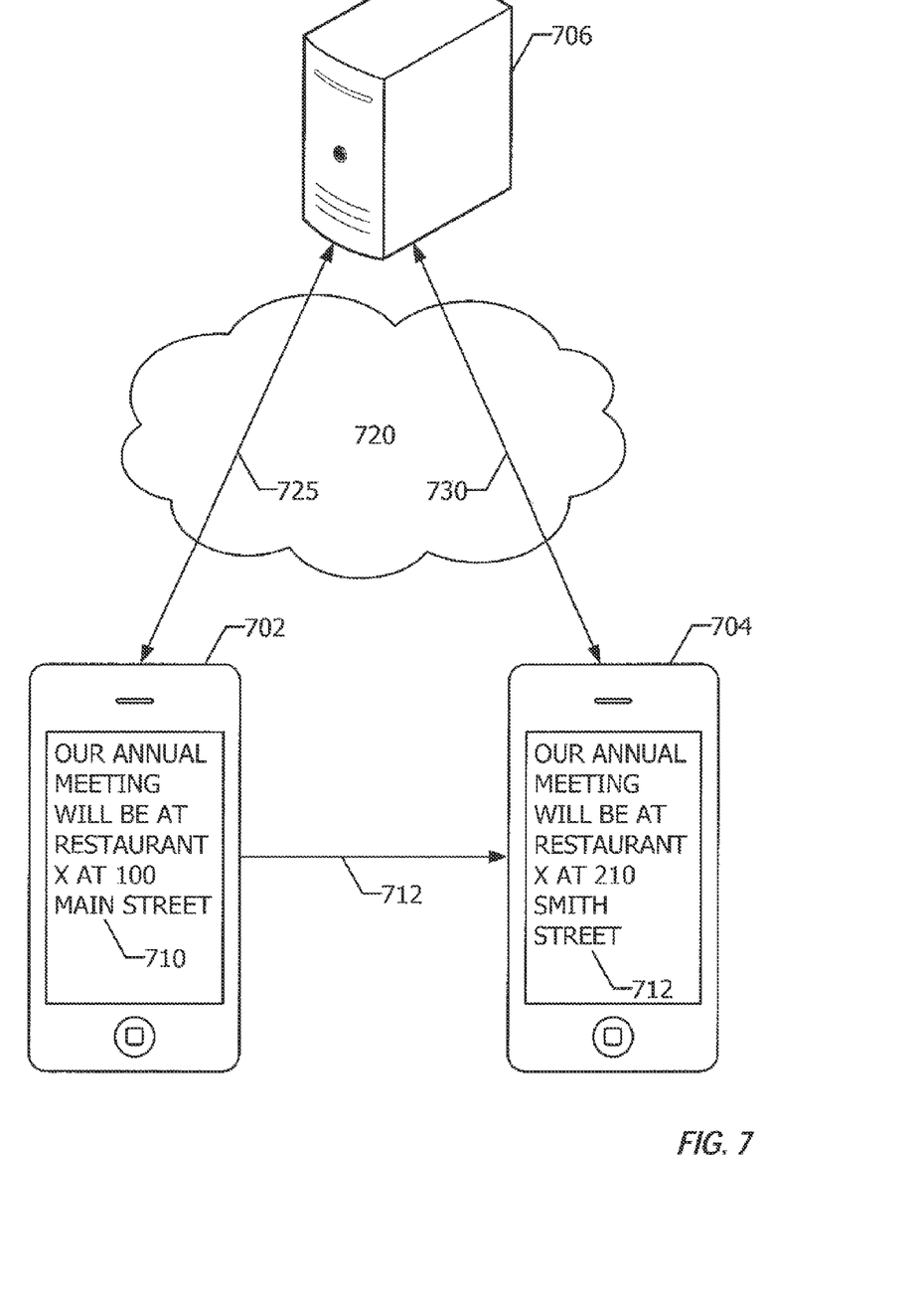
FIG. 7 illustrates an example context-aware message in which the device on which the message is composed accesses a remote source and attaches a reference to the remote source to the context-aware message according to one embodiment.

In yet another example of the modification of textual data based on information obtained from a remote source, FIG. 7 illustrates the modification of a message based on changes that occur between the sending of the message and a subsequent viewing of the message. A user of device 702 creates message 710 that includes a reminder for a meeting that occurs at some point in the future. In the illustrated embodiment, message 710 identifies a venue for the meeting, and, because the user recognizes that situations may change prior to the date of the meeting, the venue is identified as a context-based portion of message 710. Message 710 is therefore modified to include context-dependent data and is sent as context-aware message 712.

In one embodiment, the context-dependent data may include information obtained by device 702 by means of a connection 725 to server computer system 706 via network 720. Server 706 may represent one or more servers (e.g., web servers, data storage servers, email servers, etc.) that provide information that is retrievable by a device sending and/or displaying a context-aware message. In one embodiment, the context-dependent data may express the venue information in a context-neutral manner based on an identifier of the venue for a venue review web application hosted by server 706. A venue review application, such as Yelp®, may provide information and customer reviews for numerous venues. (YELP is a registered trademark of Yelp Inc.) By linking the venue information in the message to a context-neutral identifier for the venue, the message may be updated if information about the venue changes. For example, in the illustrated embodiment, prior to the display of message 712 by device 704, the restaurant identified in message 712 changes location. Because the location change is reflected in the venue review application listing for the restaurant, device 704 accesses server 706 via connection 730 and retrieves the updated information using the identifier. Therefore, message 712 may display the new location "210 Smith Street" rather than the old location "100 Main Street" referenced in message 710. Consequently, the user of device 704 may avoid the frustration of arriving at the wrong location.

As illustrated in FIG. 7, the text of a context-aware message may be dependent upon the timing of the display of the message. Thus, context refers not only to the properties of a device displaying a message but also to the properties of the message itself at the time the message is displayed. Accordingly, a context-aware message may be dynamic in that it reflects the most current information available at the time of its display. Context-aware messages may therefore provide dynamic updates to messages that include weather information (with weather forecast information linked to a context-neutral weather forecast application), event information (with timing and speaker information linked to a context-neutral event website), flight information (with departure and arrival information linked to a context-neutral airline application), or any other information that may be subject to change.

Figure 8:
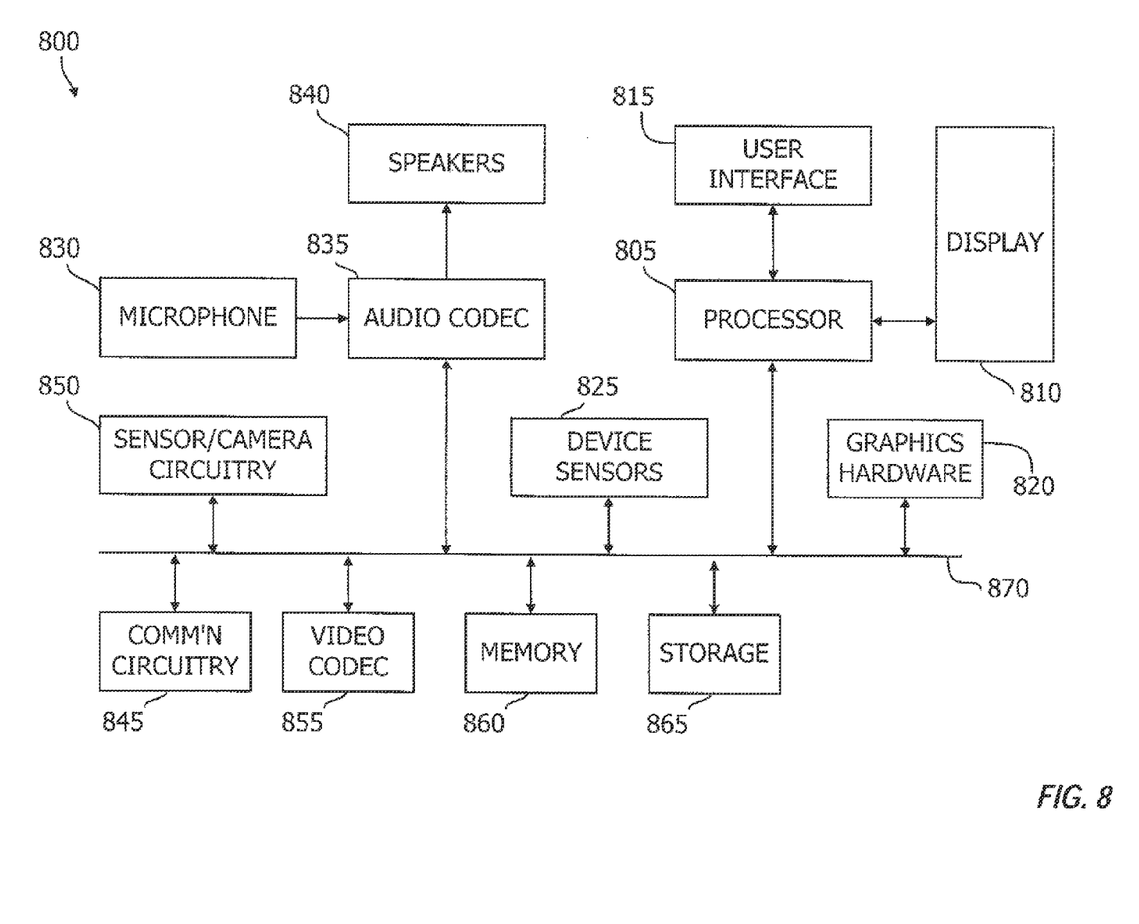
FIG. 8 is a block diagram illustrating an electronic device in accordance with one embodiment.

Referring to FIG. 8, a simplified functional block diagram of an illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a personal digital assistant (PDA), personal music player, mobile telephone, notebook, laptop or a tablet computer, desktop computer, or server computer. More particularly, any of the sending devices, receiving devices, and remote sources described above may take the form of device 800.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable graphics processing unit (GPU).

Sensor and camera circuitry 850 may capture still and video images that may be processed, at least in part, by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the methods described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. At least one non-transitory program storage device, readable by at least one processor and comprising instructions stored thereon to cause the at least one processor to:
  compose a message on a sending device;
  identify, with the sending device, a context-based portion of the message, wherein the context-based portion is at least a portion of the message configured to be modified based on one or more contexts of a receiving device;
  associate, with the sending device, context-dependent data with the context-based portion of the message to generate a context-aware message, wherein the context-dependent data comprise context-neutral information to alter-the context-based portion of the message based on the one or more contexts of the receiving device; and
  cause transmitting, with the sending device, of the context-aware message that includes the context-based portion of the message and the context-dependent data.

2. The at least one non-transitory program storage device of claim 1, wherein the instructions to cause the at least one processor to identify the context-based portion of the message comprise instructions to cause the at least one processor to:
   automatically identify, with the sending device, the context-based portion of the message; and
   cause display of a second message on the sending device requesting user input to confirm that the context-based portion has been properly identified.

3. The at least one non-transitory program storage device of claim 1, wherein the instructions to cause the at least one processor to identify the context-based portion of the message comprise instructions to cause the at least one processor to identify the context-based portion of the message in response to a manual selection received by the sending device.

4. The at least one non-transitory program storage device of claim 1, wherein the context-based portion of the message comprises a drive time portion and a distance portion, and wherein the context-neutral information expresses the drive time portion and distance portion as coordinates for a destination location.

5. The at least one non-transitory program storage device of claim 1, wherein the context-aware message includes one or more instructions on how to convert the context-neutral information to display information based on the one or more contexts of the receiving device, and wherein the context-aware message includes a tag to identify the context-dependent data within the context-aware message.

6. The at least one non-transitory program storage device of claim 1, wherein the receiving device converts the context-based portion within the context-aware message based on the one or more context of the receiving device.

7. A method, comprising:
   generating a message on a sending device;
   identifying, by the sending device, a context-based portion of the message, wherein the context-based portion is at least a portion of the message adapted to be modified according to one or more contexts of a receiving device;
   associating, by the sending device, context-dependent data with the context-based portion of the message to generate a context-aware message, wherein the context-dependent data comprise context-neutral information to alter the context-based portion of the message based on the one or more contexts of the receiving device; and
   transmitting, by the sending device, the context-aware message that includes the context-based portion of the message and the context-dependent data.

8. The method of claim 7, wherein associating context-dependent data with the context-based portion of the message comprises appending the context-dependent data to a uniquely identified section of the message to generate the context-aware message.

9. The method of claim 7, wherein the context-aware message comprises a markup language annotation for identifying the context-dependent data within the context-aware message.

10. The method of claim 7, wherein the context-aware message includes instructions to convert the context-neutral information to display information based on the one or more contexts of the receiving device, and wherein the context-aware message includes a tag to identify the context-dependent data within the context-aware message.

11. The method of claim 7, wherein the receiving device converts the context-based portion within the context-aware message based on the one or more context of the receiving device.

12. At least one non-transitory program storage device, readable by at least one processor and comprising instructions stored thereon to cause the at least one processor to:
   receive a context-aware message at a receiving device;
   identify, with the receiving device, data included in the received context-aware message, the data includes at least one context-based portion of the received context-aware message and at least one context-dependent data, wherein the at least one context-based portion is at least a portion of the context-aware message configured to be modified according to one or more contexts of the receiving device, wherein the context dependent data comprises a context-neutral representation associated with the at least one context-based portion;
   generate, with the receiving device, an altered version of the at least one context-based portion based, at least in part, on the context neutral representation and the one or more contexts of the receiving device; and
   cause display, on the receiving device, of the received context-aware message with the altered version of the at least one context-based portion of the received message.

13. The at least one non-transitory program storage device of claim 12, wherein the instructions to generate, with the receiving device, comprises instructions that cause the at least one processor to convert the context-neutral representation to the altered version of the at least one context-based portion according to the one or more contexts of the receiving device and one or more instructions within the received context-aware message.

14. The at least one non-transitory program storage device of claim 12, wherein the instructions to generate comprises instructions that cause the at least one processor to:
   determine properties of the receiving device; and
   access the properties in a local data store.

15. The at least one non-transitory program storage device of claim 12, wherein the instructions to generate comprise instructions that cause the at least one processor to:
   identify a location of the receiving device; and
   identify at least one location-based property corresponding to the identified location.

16. The at least one non-transitory program storage device of claim 12, wherein the instructions to generate comprise instructions that cause the at least one processor to access information from a remote source, wherein the remote source is identified in the data included in the received message.

17. The at least one non-transitory program storage device of claim 12, wherein the received message comprises a markup language annotation for identifying the context-dependent data included in the received context-aware message.

18. The at least one non-transitory program storage device of claim 12, wherein the one or more contexts includes historical information obtained from one or more sensors of the receiving device, and wherein the received context-aware message includes a tag to identify the context-dependent data within the context-aware message.

19. A sending device, comprising:
   a display element;
   at least one memory; and at least one processor communicatively coupled to the display element and configured to execute instructions stored in the at least one memory to:
  cause display, on the display element, a message entry interface on the sending device,
  receive a message entered through the interface on the sending device,
  identify a context-based portion of the received message, wherein the context-based portion is at least a portion of the message configured to be modified according to one or more contexts of a receiving device,
  generate a context-neutral representation of the context-based portion of the received message,
  supplement the received message with context-dependent data to generate the context-aware message, wherein the context-dependent data comprises the context-neutral representation to modify the context-based portion of the received message based on the one or more context of the receiving device, and
  cause transmission of the context-aware message that includes the context-based portion of the receive message and the context-dependent data.

20. The sending device of claim 19, wherein the receiving device is to convert the context-based portion within the context-aware message based on the one or more context of the receiving device.

21. The sending device of claim 19, wherein the context-aware message includes a tag to identify the context-dependent data within the context-aware message.

22. A receiving device, comprising:
a display element;
at least one memory; and
at least one processor communicatively coupled to the display element and configured to execute instructions stored in the at least one memory to:
  receive a context-aware message comprising a context-based portion and context-dependent data on the receiving device, wherein the context-based portion is at least a portion of the context-aware message configured to be modified according to one or more contexts of the receiving device,
  identify, within the received context-aware message, the context-based portion and the context-dependent data, wherein the context-dependent data includes a context-neutral representation of the context-based portion of the received context-aware message,
  modify the context-based portion of the received message based, at least in part, on the context-neutral representation and the one or more contexts of the receiving device, and
  cause display of the received context-aware message with the modified context-based portion on the display element.

23. The receiving device of claim 22, wherein the received context-aware message includes a tag to identify the context-dependent data within the context-aware message.

* * * * *